United States Patent [19]

Iinuma et al.

[11] Patent Number: 4,720,743
[45] Date of Patent: Jan. 19, 1988

[54] PREDICTINE CODING/DECODING SYSTEM FOR BLOCK-FORMED PICTURE SIGNALS

[75] Inventors: Kazumoto Iinuma; Yukihiko Iijima, both of Tokyo; Hideo Kuroda; Hideo Hashimoto, both of Kanagawa, all of Japan

[73] Assignee: NEC Corporation and Nippon Telegraph and Telephone Corporation, Tokyo, Japan

[21] Appl. No.: 796,683

[22] Filed: Nov. 12, 1985

[30] Foreign Application Priority Data

Nov. 9, 1984 [JP] Japan ............................ 59-236228

[51] Int. Cl.⁴ ............................................. H04N 7/12
[52] U.S. Cl. .................................... 358/133; 358/136; 358/138
[58] Field of Search ............... 358/133, 135, 136, 138, 358/260

[56] References Cited

U.S. PATENT DOCUMENTS

| 4,193,096 | 3/1980 | Stoffel ............................ 358/138 X |
| 4,383,272 | 5/1983 | Netravali et al. ............... 358/138 X |
| 4,460,923 | 7/1984 | Hirano et al. ........................ 358/136 |
| 4,562,468 | 12/1985 | Koga ................................... 358/136 |

Primary Examiner—E. A. Goldberg
Assistant Examiner—Patrick W. Foster
Attorney, Agent, or Firm—Sughrue, Mion, Zinn, Macpeak & Seas

[57] ABSTRACT

A predictive coding/decoding system for block-formed picture signals includes predictive coding and decoding units in transmitter and receiver sides, respectively: each of the predictive coding and decoding units is provided with a control pulse generator responsive to a horizontal synchronization pulse in the picture signal to produce a sampling signal and a select signal, and a pair of selectors together responsive to the select signal to select a sum of a prediction signal and a prediction error signal or a fixed value as an input of a prediction circuit, the pair of selectors selecting the fixed value for a partial picture block including a fraction of pixels due to the block formation.

5 Claims, 4 Drawing Figures

PREDICTINE CODING/DECODING SYSTEM FOR BLOCK-FORMED PICTURE SIGNALS

BACKGROUND OF THE INVENTION

The present invention relates to a predictive coding/decoding system for block-formed picture signals wherein the block formed picture includes a fraction of pixels (picture elements) due to the block formation.

For a system for coding a picture signal with high efficiency, a predictive coding system is proposed. An example of such a predictive coding system is disclosed in U.S. Pat. No. 4,460,923. The predictive coding system comprises a scan converter in which a plurality of blocks are formed to convert an input video signal into a block formation video signal, a subtractor to make the difference between the block-formation video signal suitably delayed and a prediction signal from a prediction signal generator to be referred to soon to generate a prediction error signal, a quantizer to limit the number of possible levels of the prediction error signal, and a code compressor responsive to the quantized prediction error signal from the quantizer to generate compressed information which will be transmitted to a transmission path. The predictive coding system further comprises an adder for adding the quantized prediction error signal to the prediction signal to generate a locally decoded signal, and the prediction signal generator operative to generate a prediction signal by using the delayed local decoding signal and in accordance with information signifying an optimum prediction function (motion vector) supplied from an optimum prediction or motion detector. Thus, the above-mentioned predictive coding system makes it possible to determine a motion vector in accordance with both motion vector information and prediction error information, thereby providing a remarkably improved coding efficiency especially where the transmission speed is low. Accordingly, such a predictive coding system is especially effective where a television signal undergoes compressive coding and is transmitted at a low speed.

In the above-mentioned predictive coding system, a motion compensated predictive coding system is employed for improving coding efficiency. The motion compensated predictive coding system is to divide a picture signal into a two-dimensional block with m columns and n rows (m and n are positive integers, respectively) to detect the most adaptive block of the previous frame of the previous field by the blocks thus obtained as a unit, thus effecting predictive coding by using the value of pixels within the block as prediction signal. In addition, an entropy coding system for a prediction error signal is to divide a prediction error signal into a two-dimensional block with k columns and l rows (k and l are positive integers, respectively) to execute an entropy coding processing in the two-dimensional unit, thus providing an improved coding efficiency.

In such a high efficiency coding system for picture signals, signal processing per each two-dimensional block is often employed. However, frequently, there are instances where one picture frame cannot be necessarily divided into m×n (or k×l) two-dimensional block, namely, the number of pixels of the one picture frame is not equal to a multiple of an integer of m or n (k or l), resulting in occurrence of a fraction of pixels. However, with the two-dimensional block coding system in such a case, the coding processing in respect to the fraction becomes very complicated. Accordingly, if an attempt is made to completely execute the processing in respect to the fraction, the scale of the system becomes very large.

SUMMARY OF THE INVENTION

With the above in view, an object of the present invention is to provide a predictive coding system facilitating the processing in regard to fractions of pixels produced as a result of dividing a picture signal into a two-dimensional block.

Another object of the present invention is to realize a coding/decoding processing for a picture signal in the coder/decoder without regard to the existence of an area where there exists fraction of pixels.

According to the present invention, there is provided a predictive coding/decoding system for a picture signal to form the picture signal as a two-dimensional block, thus providing a function of processing the picture signal in the two-dimensional unit, the improvement wherein a predictive coding unit is provided with means for setting a prediction signal and a prediction error signal to a fixed value in regard to an area where there exists fraction of pixels produced as a result of formation of the two-dimensional block. For instance, an NTSC color television signal is used as the picture signal and an area having seven scanning lines within the first field of the NTSC-color television signal and an area having six scanning lines within the second field thereof define the area where there exists fraction of pixels. The two-dimensional block is formed in the area having 256 scanning lines within the first and second fields.

BRIEF DESCRIPTION OF THE DRAWINGS

The features and advantages of a predictive coding system according to the present invention will become more apparent from the following description taken in conjunction with the accompanying drawigns, in which.

DESCRIPTION OF THE PREFERRED EMBODIMENT

A preferred embodiment of a system for coding picture signal in block units according to the present invention will be described with reference to attached drawings.

Figure 1:
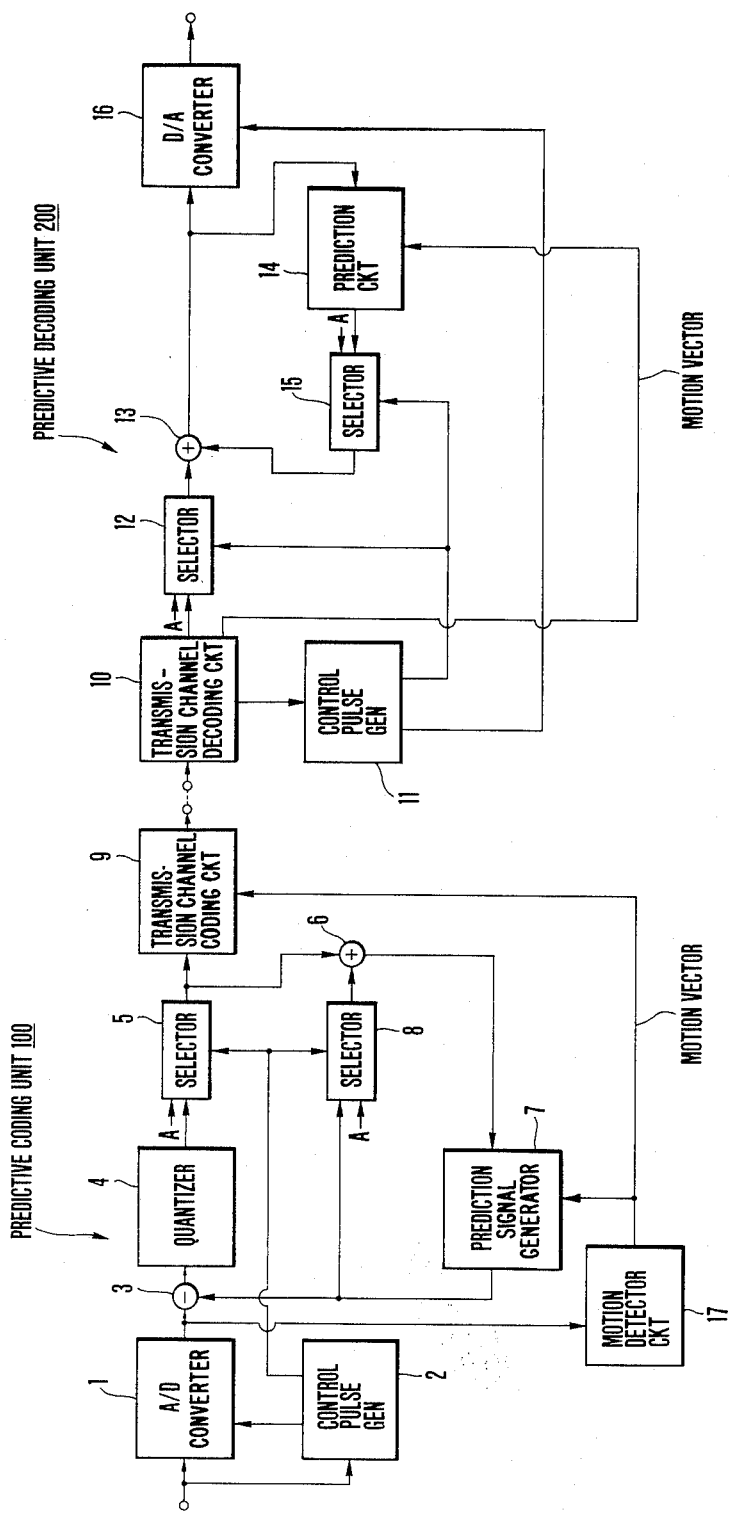
FIG. 1 is a block diagram illustrating an embodiment of a predictive coding/decoding system according to the present invention.

FIG. 1 is a block diagram showing an embodiment of a predictive coding/decoding system according to the present invention wherein a coding unit 100 is located on the side of a transmitter and operates to transmit a signal to a decoding unit on the side of a receiver.

The elementary circuit configuration of the predictive coding unit 100 is similar to that of the coding unit disclosed in the above-mentioned U.S. Pat. No. 4,460,923. Namely, the predictive coding unit 100 includes an A/D converter 1 for converting an input picture signal into a digital picture signal, a subtractor 3 to make the difference between the digital picture signal and a prediction signal from a prediction signal generator 7 to generate a prediction error signal, a quantizer 4 to limit the number of possible levels of the prediction error signal, and adder 6 to add the quantized prediction error signal to the prediction signal from the prediction signal generator 7, and a motion detector circuit 17 responsive to the digital picture signal to deliver a motion vector to the prediction signal generator 7 and to a transmission channel coding circuit 9 which also responds to the quantized prediction error signal to transmit a coded signal suitable for the transmission channel to the predictive decoding unit 200 to be referred to later.

The coding unit 100 of this embodiment is characterized in that there are newly provided a control pulse generator 2 responsive to the input picture signal to produce a sampling pulse and a select signal, a selector 5 responsive to the select signal to select either a fixed value A or the quantized prediction error signal from the quantizer 4, and a selector 8 responsive to the select signal to select either a fixed value A or the prediction signal from the prediction signal generator 7.

On the other hand, the predictive decoding unit 200 also has a circuit configuration similar to the decoding unit disclosed in U.S. Pat. No. 4,460,923. Namely, the predictive decoding unit 200 includes a transmission channel decoding circuit 10 to decode the coded signal transmitted from the predictive coding unit 100 to produce a decoded signal, an adder 13 to add the decoded signal to a prediction signal from a prediction circuit 14 which responds to an output signal from the adder 13 and a motion vector fed from the transmission channel decoding circuit 10, and a D/A converter 16 to convert a digital signal obtained as the output of the adder 13 into an analog picture signal.

The predictive decoding unit 200 of this embodiment is characterized in that there are newly provided a control pulse generator 11 responsive to the decoded signal from the tansmission channel decoding circuit 10 to generate a select signal and a timing pulse, a selector 12 to select either a fixed value A or the decoded signal from the transmission channel decoding circuit 10, and a selector 15 to select either a fixed value A or the prediction signal from the prediction circuit 14.

The operation of the predictive coding unit 100 thus configured will be described.

An analog input picture signal is initially delivered to the A/D converter 1 and the control pulse generator 2. The control pulse generator 2 is operative to produce the sampling pulse and the select signal in synchronism with a horizontal synchronization frequency of the input picture signal and to deliver the sampling pulse to the A/D converter 1 and deliver the select signal to the selectors 5 and 8. The A/D converter 1 responds to a sampling pulse delivered from the control pulse generator 2 to sample the analog input picture signal, thereby to convert it into a digital digital picture signal. The picture signal is delivered to the subtractor 3 and to the motion detector circuit 17. The subtractor 3 is operative to calculate a difference (i.e. a prediction error signal) between a prediction signal outputted from the prediction circuit 7 and the input picture signal to deliver the prediction error signal to the quantizer 4. The quantizer 4 is operative to quantize the prediction error signal in accordance with a predetermined quantization characteristic to deliver the quantized prediction error signal to the selector 5. When the select signal from the control pulse generator 2 represents a first logical state, (e.g. H level), the selector 5 selects the quantized prediction error signal from the quantizer 4. In contrast, when the select signal from the control pulse generator 2 represents a second logical state (e.g. L level), the selector 5 selects the fixed value A in place of the quantized prediction error signal. The output of the selector 5 is delivered to the transmission channel coding circuit 9 and to the adder 6. The adder 6 is operative to calculate the sum of outputs of the selectors 5 and 8 to deliver the calculated result to the prediction signal generator 7. On the other hand, the motion detector circuit 17 is operative to form the input picture signal converted into the digital signal in the A/D converter 1 as a two-dimensional block to detect a motion vector indicating the position and the movement of a picture of the current frame with respect to the previous frame when the two-dimensional block is used as unit. The motion vector detected by the motion detector circuit 17 is delivered to the prediction signal generator 7 and to the transmission channel coding signal generator 9. The prediction circuit 7 responds to the motion vector delivered from the motion detector circuit 17 to vary a prediction function in the two-dimensional block unit, i.e. vary a frame delay time in the case of the interframe predictive coding system to generate a motion compensated prediction value. Further, the prediction signal generator 7 is operative to calculate a prediction signal by using a predetermined prediction function to deliver the calculated result to the subtractor 3 and the second selector 8. The second selector 8 responds to the select signal fed from the control pulse generator 2 to select either the prediction signal or the predetermined fixed value A to deliver a selected one to the adder 6. It is here noted that the control pulse generator 2 produces the select signal so that when the selector 5 selects the prediction error signal fed from the quantizer 4, the selector 8 selects the prediction signal fed from the prediction signal generator 7. Accordingly, when the prediction error signal and the prediction signal are outputted from the selectors 5 and 8, respectively, an ordinary predictive coding is executed. The adder 6 is operative to output a locally decoded signal. The output of the selector 5 is supplied to the adder 6 and at the same time to the transmission channel coding circuit 9. The transmission channel coding circuit 9 is operative to apply the entropy coding and error correction coding to the output from the selector 5 and to multiplex the signal thus coded and the information indicative of the sampling frequency. The transmission channel coding circuit 9 is also operative to apply the entropy coding (e.g. variable length coding or run length coding) to the motion vector delivered from the motion detector circuit 17.

Figure 2:
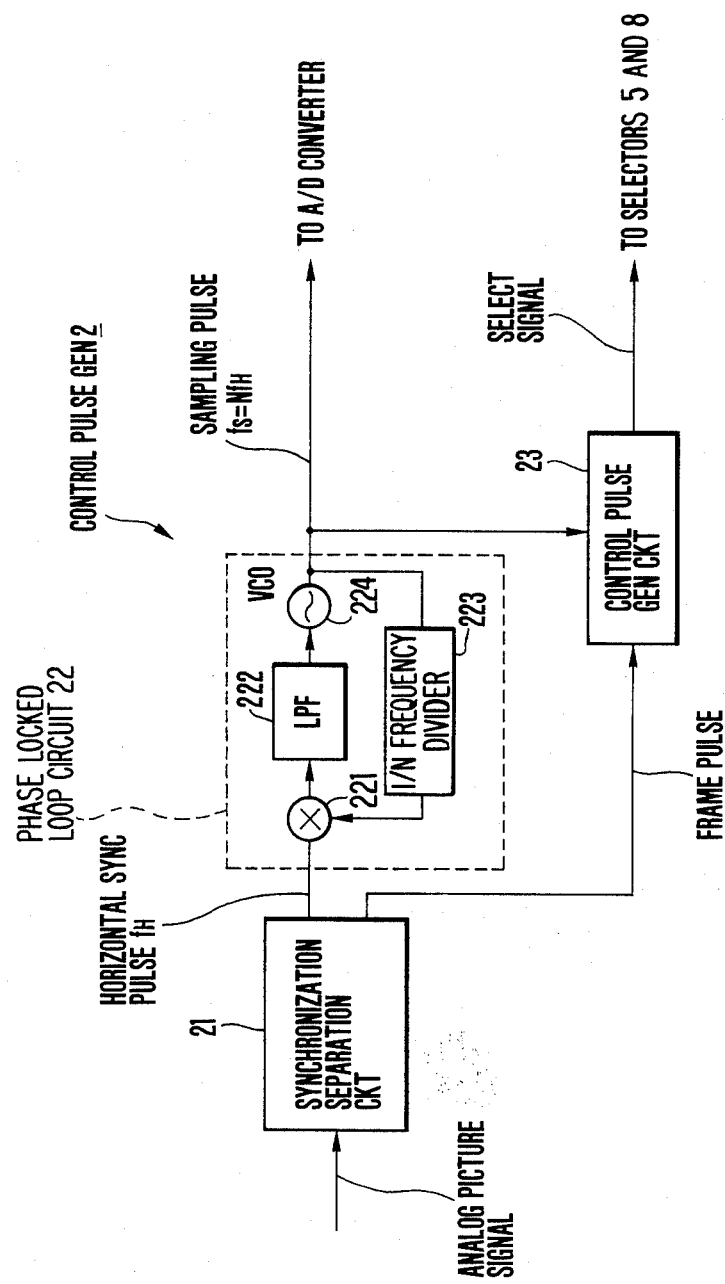
FIG. 2 shows details of a control pulse generator provided in the coding unit shown in FIG. 1.
Figure 3:
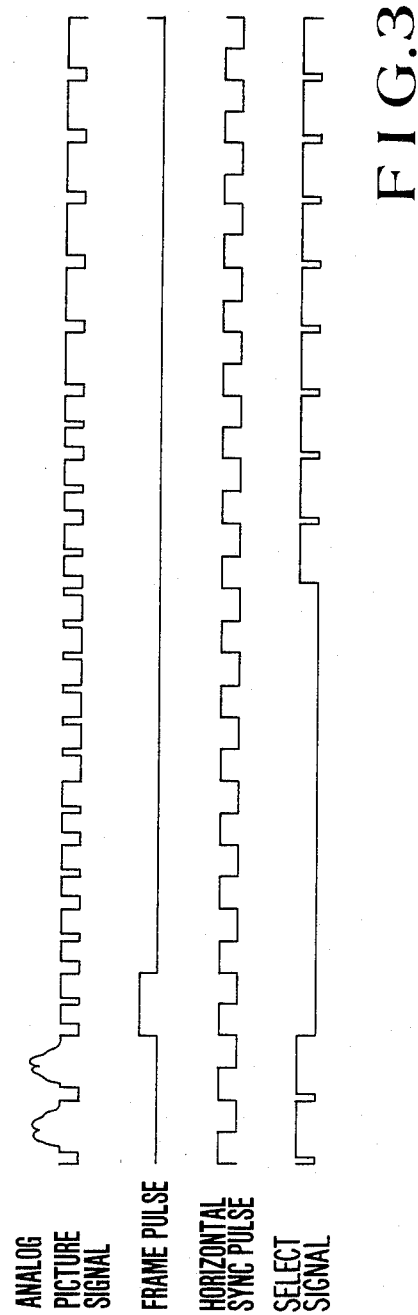
FIG. 3 shows a time chart of the circuit shown in FIG. 2.

FIG. 2 shows details of the control pulse generator 2 provided in the above-mentioned coding unit 100 shown in FIG. 1, and FIG. 3 shows the time chart of the circuit shown in FIG. 2.

The input analog picture signal is separated by a synchronizing separation circuit 21 into a horizontal synchronization pulse signal (having a horizontal synchronization frequency $f_H$) and a frame pulse signal. The horizontal synchronization pulse signal is fed to a phase locked loop (PLL) circuit 22. The PLL circuit 22 has the known circuit arrangement consisting a subtractor 221 to output an error signal representing a phase difference between the horizontal synchronization pulse signal and an output signal from a 1/N frequency divider 223, a low pass filter (LPF) adapted to input the error signal from the subtractor 221, and a voltage controlled oscillator (VCO) 224 adapted to input the output signal from the LPF 222. Thus, the sampling pulse signal having frequency $f_s$ ($=N f_H$) is obtained as an output of the PLL circuit 22. The sampling pulse is delivered to the A/D converter 1 (FIG. 1) and is fed to a control pulse generator circuit 23. The control pulse generator circuit 23 responds to the frame pulse signal fed from the synchronization separating circuit 21 and the sampling pulse signal fed from the PLL circuit 22 to produce the select signal which will be delivered to the selectors 5 and 8. As seen from FIG. 3, when the select signal represents L level, the selectors 5 and 8 select the fixed value A as their inputs, respectively.

Then, the operation of the predictive unit 200 will be described. A coded picture signal transmitted from the predictive coding unit 100 through a transmission path is first fed to the transmission channel decoding circuit 10. The transmission channel decoding circuit 10 is operative to separate information indicative of sampling frequency to deliver the sampling frequency information thus separated to the control pulse generator 11. The control pulse generator 11 is operative to produce a select signal and a timing pulse in synchronism with the horizontal synchronization frequency of the picture signal in a manner similar to the control pulse generator 2 to deliver the select signal to the selectors 12 and 15 and deliver the timing pulse to the D/A converter 16. Further, the transmission channel decoding circuit 10 is operative to apply error correction decoding and entropy decoding to the picture signal and the motion vector to deliver the decoded picture signal to the selector 12 and to deliver the motion vector to the prediction circuit 14. The selector 12 selects either an output from the transmission channel decoding circuit 10 or the predetermined fixed value A depending upon the logical state of the select signal fed from the control pulse generator 11 to produce selected one as its output. The output of the selector 12 is delivered to the adder 13. The adder 13 is operative to calculate the sum of the outputs from the selector 12 and the selector 15 to deliver the calculated result to the prediction circuit 14 and to the D/A converter 16. The prediction circuit 14 calculates the same prediction function as that of the prediction signal generator 7 provided in the predictive coding unit 100 to deliver the calculated result to the selector 15. The prediction circuit 14 also calculates a motion compensated prediction value in the two-dimensional block unit in accordance with the motion vector fed from the transmission decoding circuit 10 in a manner similar to the prediction signal generator 7 provided in the predictive coding unit 100. The selector 15 selects either a prediction signal obtained as an output of the prediction circuit 14 or the predetermined fixed value A depending upon the logical state of the select signal fed from the control pulse generator 11 to deliver a selected one to the adder 13. It is here noted that the control pulse generator 11 produces the select signal having a logical state so that the selector 15 selects the output from the prediction circuit 14 (i.e. the prediction signal) when the selector 12 selects the output from the transmission channel decoding circuit 10 (i.e. the prediction error signal). Accordingly, a decoded picture signal is obtained as an output of the adder 13. The decoded picture signal thus obtained is converted into an analog picture signal by the D/A converter 16.

As understood from the foregoing description in connection with the embodiment of the predictive coding/decoding system according to the present invention, where there exists fraction of pixels produced as a result of formation of the two-dimensional block of the picture signal, the control pulse generators 2 and 11 produce control pulse signals i.e. select signals so that the selectors 5, 8, 12 and 15 output the predetermined fixed value A, respectively. By controlling the selectors 5, 8, 12 and 15 in this way, where there exists fraction of pixels produced as a result of formation of the two-dimensional block, a signal 2A which is twice larger than the fixed value A is always produced as the locally decoded signal, i.e., the output of the adder 6 and as the decoded signal, i.e., the output of the adder 13. Accordingly, in the area where there exists fraction of pixels, it is unncessary that the prediction signal and the prediction error signal in the predictive coding unit 100 and the predictive decoding unit 200 are coincident with each other, and further, the predictive coding and the predictive decoding are not influenced by the values of the prediction signal and the prediction error signal.

Furthermore, since both the locally decoded signal and the decoded signal are decoded to 2A, the predictive decoding unit 200 can correctly reproduce a picture signal without coding it and transmitting the coded signal in the transmission channel coding circuit 9. Even in the case where a part of the picture signal is not transmitted to the predictive decoding unit 200 as stated above, the predictive coding circuitry comprising the subtractor 3, the quantizer 4, the adder 6 and the prediction signal generator 7 and the predictive decoding circuitry comprising the adder 13, and the prediction circuit 14 can encode and decode pixels without discrimination between pixels to be transmitted and pixels not to be transmitted by these circuitry themselves.

Figure 4:
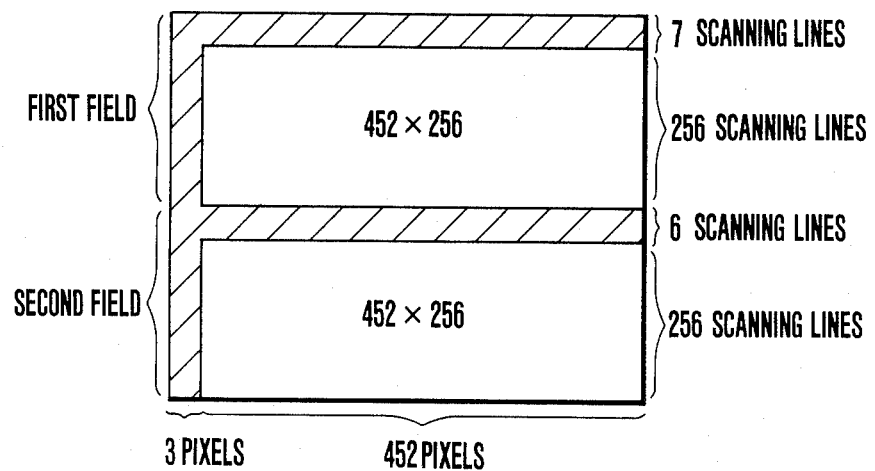
FIG. 4 shows an example of an area where there exists fraction of pixels produced as a result of formation of a two-dimensional block in the present invention.

FIG. 4 illustrates an example of the fraction of pixels produced as a result of formation of the two-dimensional block in the case where an NTSC color signal is sampled by using a frequency twice larger than a color subcarrier frequency. In the figure, hatched portion corresponds to partial picture block including the fraction of pixels. Accordingly, in the example of the block formation, when predictive coding and predictive decoding are applied to pixels located at hatched portions, the fixed value A is selected as each output of the selectors 5, 8, 12 and 15. Where block formation selected so that the size in a vertical direction is the n-th power of 2 (two) is implemented, by carrying out a selection such that the partial picture block including the fraction of pixels is defined by 7 (seven) scanning lines within the vertical synchronization signal section of the first field and 6 (six) lines with the vertical synchronization signal section of the second field, it is possible to realize processing for the partial picture block including the fraction of pixels without striking out picture images appearing on a television screen i.e. affecting picture image appearing thereon.

As described above, the predictive coding/decoding system according to the present invention is configured to forcedly fix a prediction signal and a prediction error signal in the predictive coding unit and the predictive decoding unit to a predetermined fixed value A. Thus, this eliminates the necessity of transmission of coded information in regard to the partial picture block including the fraction of pixels. In addition, the predictive coding unit and the predictive decoding unit can implement coding and decoding without drawing particular attention to the partial picture block.

What is claimed is:

1. In a predictive coding/decoding system for picture signals to form a picture signal as a two-dimensional block, thereby functioning to process said picture signal by using said two-dimensional block as a unit, the improvement comprising:

means operative to set a prediction signal and a prediction error signal generated in a predictive coding unit to predetermined fixed values, respectively, in a partial picture block produced as a result of the formation of said two-dimensional block.

2. A predictive coding/decoding system for picture signals as set forth in claim 1, wherein an NTSC color television signal is used as said picture signal, and said partial picture block comprises a section defined by 7 scanning lines within a first field of said NTSC signal and a section defined by 6 scanning lines within a second field thereof, thereby designating a section defined by 256 scanning lines within said first and second fields as an area where said two-dimensional block is to be formed.

3. A predictive coding/decoding system as set forth in claim 1, wherein said predictive coding unit comprises an analog to digital converter for converting an input analog picture signal into a digital picture signal, a control pulse generator responsive to said input analog picture signal to generate a sampling pulse and a select signal, a subtractor to make a difference between the digital picture signal and a prediction signal from a prediction circuit to produce a prediction error signal, a first selector responsive to said select signal to select either said prediction error signal or a fixed value, a coding circuit to encode an output signal of said first selector to transmit the coded signal, a second selector responsive to said select signal to select either said prediction signal or a fixed value, and an adder to add the output signal from said first selector to the output signal from said second selector to deliver the added value to said prediction circuit.

4. A predictive coding/decoding system as set forth in claim 3, wherein said predictive coding unit further comprises a quantizer to limit the number of possible levels of said prediction error signal, and a motion detector circuit to produce a motion vector in response to said digital picture signal to deliver said motion vector to said prediction circuit and to said coding circuit.

5. A predictive coding/decoding system as set forth in claim 3, wherein said control pulse generator comprises a synchronization separating circuit to separate said input analog picture signal into a horizontal synchronization pulse signal and a frame pulse signal, a phase locked loop circuit responsive to said horizontal synchronization pulse signal to produce said sampling pulse signal, and a control pulse generator circuit responsive to said sampling pulse and said frame pulse signal to generate said select signal.

* * * * *

UNITED STATES PATENT AND TRADEMARK OFFICE
CERTIFICATE OF CORRECTION

PATENT NO.    : 4,720,743

DATED         : January 19, 1988

INVENTOR(S)   : IINUMA et al.

It is certified that error appears in the above-identified patent and that said Letters Patent is hereby corrected as shown below:

| | | |
|---|---|---|
| In the title | | Delete "PREDICTINE" and insert --PREDICTIVE-- |
| COLUMN 1, | LINE 1 | Delete "PREDICTINE" and insert --PREDICTIVE-- |
| COLUMN 2, | LINE 40 | Delete "drawigns" insert --drawings-- |
| COLUMN 3, | LINE 42 | Delete "tansmission" insert --transmission-- |
| COLUMN 4, | LINE 24 | Delete "circuit" insert --signal generator-- |
| COLUMN 6, | LINE 19 | Delete "unncessary" insert --unnecessary-- |

Signed and Sealed this

Sixteenth Day of August, 1988

Attest:

DONALD J. QUIGG

Attesting Officer

Commissioner of Patents and Trademarks